Aug. 11, 1953 — S. W. ALDERSON — 2,648,199
PIPE COUPLING DEVICE FOR PNEUMATIC SYSTEMS
Filed Jan. 11, 1952

INVENTOR
SAMUEL W. ALDERSON
BY
ATTORNEY

Patented Aug. 11, 1953

2,648,199

UNITED STATES PATENT OFFICE 2,648,199

PIPE COUPLING DEVICE FOR PNEUMATIC SYSTEMS

Samuel W. Alderson, New York, N. Y.

Application January 11, 1952, Serial No. 266,030

7 Claims. (Cl. 60—62.5)

This invention relates to pneumatic devices and particularly to connectors used for coupling pneumatic lines.

The object of the invention is to provide means for coupling two sections of hose leading otherwise into a closed pneumatic system and by the act of coupling, to automatically charge the then closed system to a predetermined pressure.

The invention consists substantially of a two part connector, one part acting as a piston and the other as a cylinder so constructed and arranged that upon the beginning of the movement of insertion of the piston into the cylinder, the pneumatic system will be closed and during the remaining movement thereof a definitely measured volume will be displaced by the piston to charge the system therewith, which amount being predetermined and related to the capacity of the system as a whole will increase the pressure therein to a definite and predetermined value.

The invention, while of broad application, has found a specific application, by way of example, in the field of prosthetic devices, where pneumatic means are used for control purposes. Power operated limbs, each having a plurality of moving parts, such as an elbow flexion means, a wrist pronation means, a wrist flexion means and finger flexion means must be capable of control by an amputee, so that some simple movement within the power of the amputee will result in the proper application of power to a selected one or more of these joints. It has been found that a pneumatic system gives excellent control in many cases, is comfortable to the amputee, does not entail acrobatic contortions and does not tire the user. By way of example, bladders or bellows placed beneath the heel, the big toe and the little toe of the amputee may be easily and selectively operated to produce mechanical movements within an artificial arm where such movements may be translated into impulses to control the application of power to the various joints thereof. It has been found that an amputee quickly learns the routines for inconspicuous selective and sequential operation of these controls and after a short period of training is able to operate a power driven arm through the complicated movements of simulated naturalness so that his disability becomes far less noticeable and he is able to join in many more of the daily activities of his fellows.

One requirement of such a pneumatic control is that the coupling of the parts of the system, as upon arising and preparing for the day's activities, must be reduced to the utmost simplicity and that it remain thoroughly reliable. Pneumatic control in this application would lose most of its attractiveness and usefulness if the amputee were required either to pump up the system after it has been coupled or to solicit aid for this purpose. The act of coupling the hose must, perforce, be the single simple act required. The present invention fulfills this need.

A feature of the invention is the use of a sealing ring in the form of a torus, or tore, or anchor ring, and popularly spoken of as an O ring, that is a circular ring having a circular cross section. Such a toroidal device used in the piston ring groove forms the most perfect possible seal between the metal surfaces of the piston and the cylinder. A toroidal ring of elastic material such as rubber or some like synthetic substance appears to completely prevent any leakage of air from the closed pneumatic system. A rubber torus used in similar situations is not only an efficient sealing means in a pneumatic system but is equally good in an hydraulic system.

Another feature of the invention is the use of means to adjust the volume of air which may be trapped and automatically pumped into the closed pneumatic system. In one embodiment of the invention the piston is provided with a plurality of piston ring grooves whereby the quantity of air trapped may be determined by placing the sealing torus in a selected one thereof. It will be understood that if the sealing ring is placed in the first such groove to enter the cylinder then a maximum volume of air will be entrapped whereas if the sealing ring is placed in the last such groove a minimum of air will be entrapped.

Another feature of the invention is the use of a sealing torus at the extreme base of the cylinder where it will be in contact with the end surface of the piston. This, in itself, will be sufficient to seal the closed pneumatic system, particularly as the piston may be driven completely to the end of its stroke and held hard against this end face by some conventional means as a bayonet lock or a screw threaded retaining cap.

Another feature of the invention is the use of different materials in the cylinder and in the piston, which materials have different coefficients of expansion whereby the coupling under the influence of a rise in temperature will tend to become even more airtight than when first coupled. The device here shown and described by way of example, will be gently warmed by the body heat of an amputee, so that this means is provided to insure an increasingly secure coupling or, in other words, one that will not loosen and leak in use.

Another feature of the invention is a combined coupling for a pneumatic system and a pump for charging such a system. The device consists of a male and a female member which close the pneumatic system when brought together and then force air or other gas into the then closed system as they are moved to their final position.

Still another feature of the invention is a coupling for a pneumatic system constituting a single stroke pump. In accordance with this feature the two members of the coupling when first brought together close the system and then act as a pump during the remainder of the coupling operation. There is no check valve provided so the pumping operation is confined to a single stroke. When the device is uncoupled the pressure created in the system on the said single stroke is relieved so that as the two members are moved apart the pressure in the system is reduced to equalization with the prevailing atmospheric pressure or to the atmospheric pressure as it was at the time of coupling.

Still another feature of the invention is the employment of rings or circular ribs on the outer surface of the cylinder which perform the double function of strengthening the walls of this part of the apparatus to prevent expansion and consequent leakage and afford a surface easily and firmly grasped by inherently awkward means. The amputee, if left to his own devices, particularly before he can have put his power drive controls into operation must needs have devices which he can handle under the most adverse conditions. The outer vanes or rings formed on the cylinder part of the present coupling therefore afford a ready means for grasping this component as well as a reinforcement of the walls thereof.

Other features will appear hereinafter.

The drawing consists of a single sheet having four figures, as follows.

Figures 1, 2, 3, 4:
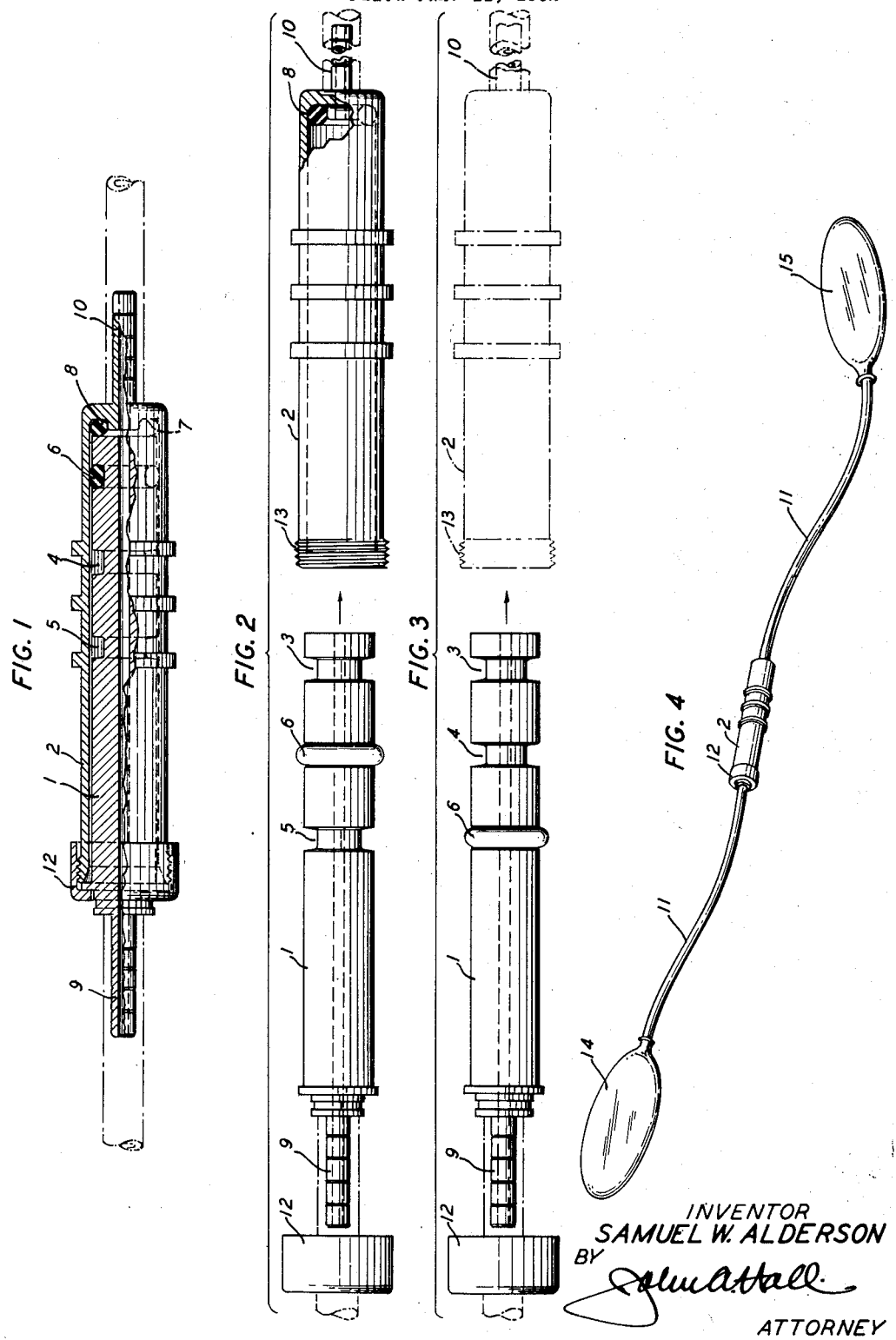
Fig. 1 is a plan view of the device partly in cross section showing the piston member inserted to its extreme position within the cylinder and clamped in such position by the retaining ring.
Fig. 2 is a plan view of the three elements of the coupling shown separately and indicating the sealing ring in the second of the piston ring grooves of the piston.
Fig. 3 is one similar to Fig. 2 in which the sealing ring is shown placed in the third piston ring groove.
Fig. 4 is a perspective view of a closed pneumatic system consisting essentially of two bladders connected by a hose which has been severed and to the severed ends of which the coupling elements have been affixed.

The device of the present invention consists essentially of two elements, 1 a piston and 2 a cylinder. Each of these elements as clearly indicated in Figs. 1, 2 and 3 has a free channel therethrough located on the longitudinal axis thereof. The piston 1 is provided with a plurality of piston ring grooves 3, 4 and 5 respectively into any one of which a sealing ring in the form of an elastic torus 6 may be placed. If the elastic torus 6 is placed in the first of these piston ring grooves 3 then as the piston is inserted into the cylinder 2 a maximum amount of air will be trapped in the cylinder and once the pneumatic system becomes closed at that instant it will be charged with this amount of air so as to raise the pressure within the pneumatic system accordingly. If the elastic torus 6 is placed in the second of these piston ring grooves 4, as indicated in Fig. 2, then a lesser but still a predetermined volume of air will be trapped and pumped into the pneumatic system and if the torus 6 is placed in the third of these piston ring grooves 5, then the smaller but still predetermined amount of air will be forced into the closed pneumatic system.

For sealing purposes a piston ring like groove 7 is formed in the forward inside face of the cylinder 2 so that another elastic torus 8 may be placed therein and act as a seal when the piston has been completely moved to the end of its stroke.

Both the piston and the cylinder are provided with nipples 9 and 10 respectively so that connection may be made to the two ends of a severed hose 11.

The piston 1 is constructed of a material having a higher coefficient of expansion than the material of the cylinder 2. By way of example, the piston 1 may be constructed of aluminum and the cylinder 2 may be constructed of stainless steel.

In order to hold the coupling together a retaining cap 12 is provided having screw threads formed on its inside surface to cooperate with the screw threads 13 formed on the outer surface of the cylinder 2. Hence, when the piston has been driven to the extreme end of its stroke the retaining cap 12 may be screwed on to the cylinder 2 to hold the coupling permanently closed. Since the coefficient of expansion of the piston is greater than that of the cylinder any rise in temperature of the coupling in use will tend to render it still more airtight.

In Fig. 4 the coupling is illustrated as being included in a closed pneumatic system consisting essentially of a bladder 14 and a bladder 15 connected by a hose 11. When this coupling has been closed as shown any pressure exerted on one of the bladders will tend to expand the other. Such a system by way of example may be used in a prosthetic device where one bladder may be placed under control of an amputee as, for instance, under one of his toes, while the other bladder may be placed within a power driven limb where its expansion will be translated into a mechanical movement useful in controlling the application of power to some one or more of the joints thereof.

What is claimed is:

1. A coupling for a pneumatic system comprising a first and a second hose terminal member, said first member being in the form of a piston having a plurality of piston ring grooves cut in the sides of the body thereof, an elastic torus placed in one of said grooves, said second member being in the form of a coacting cylinder and means to secure said terminals together when said first member is completely inserted in said second member.

2. In a closed pneumatic system, a hose severed and having the severed ends thereof terminating in a pair of coacting coupling members each having a free channel along the longitudinal axis thereof, one of said members constituting a piston, the other of said members constituting a cylinder, said piston having a piston ring groove formed in the side thereof and located near the forward end thereof, an elastic torus placed in said piston ring groove and means for holding said members together in the extreme closed position thereof.

3. In a closed pneumatic system, a hose severed and having the severed ends thereof terminating in a pair of coacting coupling members each having a free channel along the longitudinal axis thereof, one of said members constituting a piston, the other of said members constituting a cylinder, said piston having a piston ring groove formed in the side and located near the forward end thereof, said cylinder having a piston ring like groove in the forward inside face thereof, an elastic torus in each of said grooves and means for holding said members firmly together with the end surface of said piston butted against said elastic torus in the forward end of said cylinder.

4. In a closed pneumatic system, a hose severed and having the severed ends thereof terminating in a pair of coacting coupling members each having a free channel along the longitudinal axis thereof, one of said members constituting a piston, the other of said members constituting a cylinder, said piston having a plurality of piston ring grooves formed in the side thereof, an elastic torus placed selectively in one of said grooves to selectively trap one of a corresponding plurality of predetermined quantities of air in said cylinder, said cylinder having a piston ring like groove formed in the forward inside face thereof, another elastic torus placed in said groove and means to secure said piston in said cylinder with the end face of said piston butted against said second elastic torus.

5. In a closed pneumatic system, a hose severed and having the severed ends thereof terminating in a pair of coacting coupling members each having a free channel along the longitudinal axis thereof, one of said members constituting a piston, the other of said members constituting a cylinder, a piston ring groove in the side of said piston and a piston ring like groove in the forward inside face of said cylinder, an elastic torus in each of said grooves, said piston being constructed of a material having a higher coefficient of expansion than the material of said cylinder and means for securing said piston in said cylinder with the end face of said piston firmly butted against the said elastic torus in the said groove in the forward inside face of said cylinder.

6. A combination single stroke pump and a coupling for insertion in a closed pneumatic system, comprising a piston and a cylinder, said piston having a plurality of piston ring grooves, a piston ring consisting of an elastic torus for selective insertion in any one of said piston ring grooves to selectively trap different predetermined volumes of air in said cylinder upon the insertion of said piston in said cylinder, and free passages along the longitudinal axis of said piston and said cylinder to increase the pressure in said closed pneumatic system upon the further movement of said piston into said cylinder.

7. A coupling for a pneumatic system comprising two tubular hose terminals, one of said terminals being hollowed out to constitute a cylinder and the other being substantially solid to constitute a piston, both said piston and cylinder having a free passage along the longitudinal axes thereof, said cylinder having external screw threads formed thereon and a retaining cap having internal screw threads formed therein to fit said cylinder threads whereby said piston may be firmly secured in said cylinder.

SAMUEL W. ALDERSON.

References Cited in the file of this patent

UNITED STATES PATENTS

| Number | Name | Date |
|---|---|---|
| 982,836 | Ley | Jan. 31, 1911 |
| 2,314,683 | Berry | Mar. 23, 1943 |